United States Patent
Liu et al.

(10) Patent No.: US 12,498,091 B2
(45) Date of Patent: Dec. 16, 2025

(54) MONOLITHIC NATURAL LIGHT HOMOGENIZATION LIGHTING DEVICE AND METHOD BASED ON LENS AND SAWTOOTH GRATING

(71) Applicant: GLORY LIGHT TECHNOLOGY CO., LTD., Harbin (CN)

(72) Inventors: Jian Liu, Harbin (CN); Xumin Ding, Harbin (CN); Xinwei Wang, Harbin (CN); Chenguang Liu, Harbin (CN)

( * ) Notice: Subject to any disclaimer, the term of this patent is extended or adjusted under 35 U.S.C. 154(b) by 382 days.

(21) Appl. No.: 18/095,405

(22) Filed: Jan. 10, 2023

(65) Prior Publication Data
US 2023/0221482 A1 Jul. 13, 2023

(30) Foreign Application Priority Data
Jan. 11, 2022 (CN) .......................... 202210028339.7

(51) Int. Cl.
*F21S 11/00* (2006.01)
*F21V 8/00* (2006.01)

(52) U.S. Cl.
CPC .............. *F21S 11/00* (2013.01); *G02B 6/002* (2013.01); *G02B 6/0038* (2013.01)

(58) Field of Classification Search
CPC .. G02B 6/002; G02B 6/0038; G02B 19/0028; G02B 3/0068; G02B 5/045; G02B 2207/123; F21S 11/00
See application file for complete search history.

(56) References Cited

U.S. PATENT DOCUMENTS

2023/0117164 A1* 4/2023 Krasnaberski ....... G02B 5/0215
356/4.01

FOREIGN PATENT DOCUMENTS

CN 202181812 U * 4/2012 ............... E06B 3/54

* cited by examiner

*Primary Examiner* — Michael P Mooney
(74) *Attorney, Agent, or Firm* — Fideli Law PLLC; Qiang Li

(57) ABSTRACT

The present invention discloses a monolithic natural light homogenization lighting device and method based on lens and sawtooth grating, and the device can be used as lighting curtains, indoor shutters, window glasses and the like. The device includes a front surface and a rear surface in an array form, the first surface is a lens array, and the second surface is a sawtooth surface array; the outdoor natural light at a high angle is collected by the lens array surface, and transmitted to the sawtooth surface array through the intermediate medium made of the same material between the two surfaces, and then horizontally dispersed to the indoor space after being refracted by an inclined surface. The present invention can efficiently collect the natural light incident into the window, disperse the light evenly to all directions indoors, homogenize the indoor lighting, and effectively protect the indoor privacy. The device is thin and easy to mass produce, environmentally friendly and pollution-free.

7 Claims, 3 Drawing Sheets

(a)  (b)

MONOLITHIC NATURAL LIGHT HOMOGENIZATION LIGHTING DEVICE AND METHOD BASED ON LENS AND SAWTOOTH GRATING

TECHNICAL FIELD

The present invention belongs to the field of lighting system design and beam shaping, and relates to a device and method for natural light shaping. Through the designed single-piece natural light homogenization lighting device, the natural light incident from the window in the daytime can be evenly dispersed to all corners indoors, thereby making full use of natural light for indoor lighting, saving energy and reducing emissions, and improving the energy utilization rate, and the indoor privacy can be protected effectively. The device is thin and easy to mass produce, environmentally friendly and pollution-free, and can be used as lighting curtains, indoor shutters, window glasses and the like.

BACKGROUND

Research and development of natural light lighting technology in China started in the 1960s and 1970s. Since the "Green Lighting" Program was promoted in 1996, the green energy concept of natural light lighting has gradually come into the public view. With continuous in-depth research on the solar lighting technology, people also have an in-depth understanding of the natural light collection and lighting systems. Due to gradual depletion of natural resources such as oil and coal, researches on solar energy are increasing, and the shortcomings of solar energy application technology lie in relatively low conversion efficiency of solar energy, but the cost is much higher than that of other traditional conversion energy methods. Therefore, improving the utilization efficiency of solar energy and reducing the conversion cost of solar energy have become important goals of researches in recent years.

In order to improve the utilization efficiency of sunlight, one of the methods is to use a solar concentrator combined with a light guide component module, whereby the sunlight is guided through the light guide component and conducted to the solar cells or thermal conduction components to improve the collection efficiency of sunlight, thereby improving the production efficiency of solar energy conversion devices. The known solar energy conversion devices require solar concentrators to gather the incident sunlight to many focal points on the light output side for use by solar cells or thermal conduction components. However, the focal length converging the light results in a huge volume of the known solar energy conversion devices, and such huge volume of devices not only requires relatively higher production and material costs and is hard to precisely move to control the sun tracking, but also requires a large area for installing the devices. The light pipes currently occupying the mainstream of the market suffer low efficiency and poor lighting uniformity, and may cause damage to the original building structure in the process of installation, which is not conducive to the promotion and popularization.

Therefore, how to perform the solar daylighting in an efficient manner on the basis of not changing the original building structure is an urgent problem to be solved by those skilled in the art.

SUMMARY

A brief overview of the present invention is given below in order to provide a basic understanding of some aspects of the present invention. It should be understood that such overview is not an exhaustive overview of the present invention. It is intended neither to identify key or important parts of the present invention, nor to limit the scope of the present invention. Its purpose is merely to present some concepts in a simplified form as a prelude to a more detailed description to be discussed later.

In view of this, the present invention provides a monolithic natural light homogenization lighting device and method based on lens and sawtooth grating, which can make the natural light incident from the window in the daytime evenly dispersed to all corners indoors, thereby making full use of natural light for indoor lighting, saving energy and reducing emissions, and improving the energy utilization rate.

To realize the above objective, the present invention uses the following technical solution:

a monolithic natural light homogenization lighting device based on lens and sawtooth grating, including a front surface and a rear surface in an array form, the first surface is a lens array, the second surface is a sawtooth surface array, and the lens array is used for collecting outdoor natural light, and transmitting to the sawtooth surface array through the intermediate medium made of the same material between the two surfaces; and the sawtooth surface array is used for deflecting the incident natural light to the indoor space after being refracted by an inclined surface.

Preferably, the additional phase modulation of the lens array to the natural light can be expressed as $$\varphi_1 = -\frac{\pi(x_1^2 + y_1^2)}{\lambda f},$$

where $x_1$ and $y_1$ are the positions of the incident wavefront of the lens array, $\lambda$ represents the central wavelength of the natural light, and f represents the focal length of the lens; while the additional phase modulation of the sawtooth surface array to the incident natural light can be expressed as $$\varphi_2 = -\frac{2\pi}{\lambda} y_2 \cdot \sin\theta,$$

where $y_2$ represents the position of the incident wavefront of the sawtooth surface array, and $\theta$ represents the incident angle of natural light on the sawtooth surface.

Preferably, the lenses of the lens array are in the form of concave lenses or convex lenses, the surface of lenses faces the incident direction of natural light, and the normal of the lens surface forms an acute angle to the angle of incident light.

Preferably, an expression of the thickness z at different positions $x_1$ and $y_1$ on a concave lens is $$z = -\frac{x_1^2 + y_1^2}{r + \sqrt{r^2 - (x_1^2 + y_1^2)}};$$

where r represents the radius of curvature of the concave lens, and the radius of curvature is 1-5 times the minimum spacing between the concave lens and the sawtooth grating; an expression of the thickness z at different positions $x_1$ and $y_1$ on a convex lens is $$z = \frac{x_1^2 + y_1^2}{r + \sqrt{r^2 - (x_1^2 + y_1^2)}};$$

where r represents the radius of curvature of the convex lens, and the radius of curvature is 1-5 times the minimum spacing between the convex lens and the sawtooth grating.

Preferably, the inclination angle of the sawtooth in the sawtooth surface array is 20°-70°.

Preferably, the lens array corresponds to the sawtooth surface array one to one, and the center position of the sawtooth matches the optical axis of the lens unit.

Preferably, the monolithic device material of the array is the high-transmittance material with a transmittance above 85%, including but not limited to glass, resin and transparent plastic.

Preferably, both front and real surface arrays are in the form of square full-aperture arrays with a high filling rate above 95%.

A natural light homogenization lighting method based on lens and sawtooth grating, including:

the outdoor natural light is collected by the lens array, and transmitted to the sawtooth surface array through the intermediate medium made of the same material between the two surfaces; and the sawtooth surface array deflects the incident natural light to the indoor space after being refracted by an inclined surface.

The present invention provides a monolithic natural light homogenization lighting device and method based on lens and sawtooth grating, which can efficiently collect the natural light that enters from the window, evenly disperse the light to all corners indoors, and homogenize the indoor lighting thereby making full use of natural light for indoor lighting, saving energy and reducing emissions, and improving the energy utilization rate. Moreover, the structure combined lens array and sawtooth grating breaks the symmetry of light transmission and can effectively protect the indoor privacy. The device is in a monolithic form of a lens array and a sawtooth grating on the front and rear surfaces, and is thin and easy to mass produce, environmentally friendly and pollution-free, and can be used as lighting curtains, indoor shutters, window glasses and the like.

Figure 2:
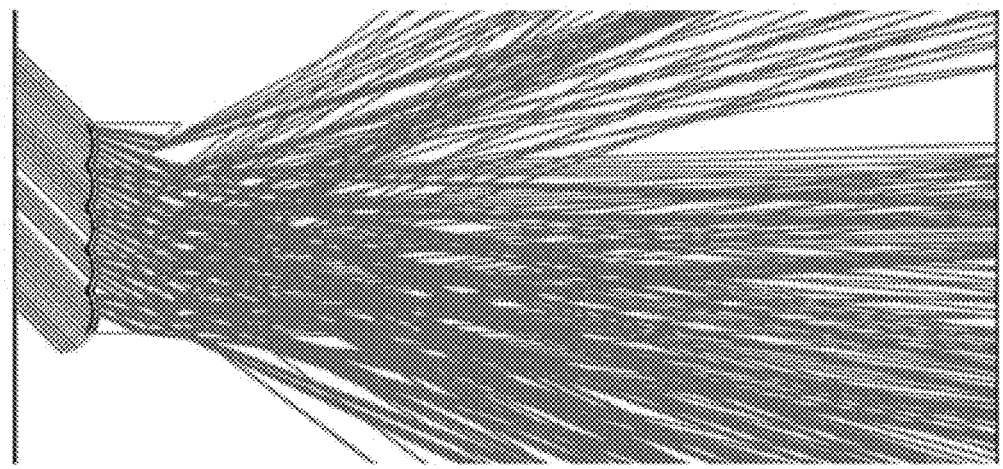

in the figure, the natural light at a high angle outdoors disperses horizontally to the indoor space after passing through the device;

FIG. 2 is a simulation result diagram of a monolithic natural light homogenization lighting method based on a combination of negative lens and sawtooth grating provided in Embodiment 1 of the present invention;

in the figure, the first surface of the design device is a lens array, and the second surface is a sawtooth surface array; the incident natural light at a high angle is collected by the lens array surface, and collected to the sawtooth surface through the intermediate medium made of the same material between the two surfaces, and then horizontally dispersed to the indoor space after being refracted by an inclined surface.

Figure 3:
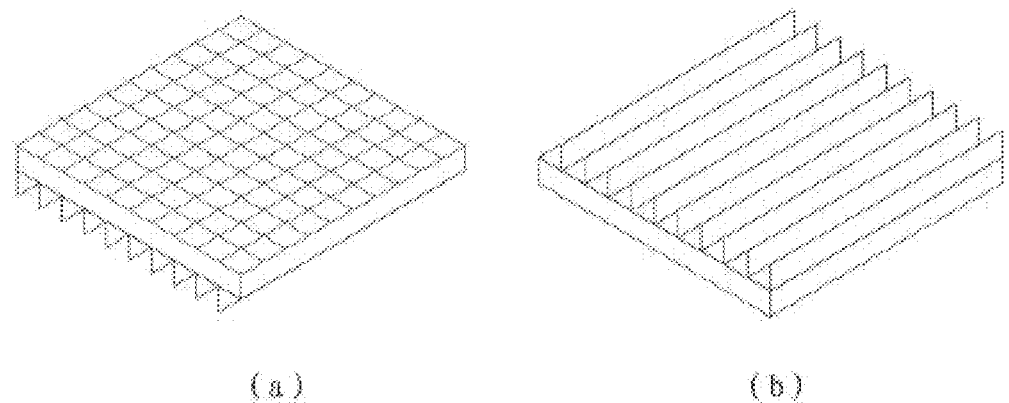

FIG. 3 is a three-dimensional view of a mechanical structure of a monolithic natural light homogenization lighting method based on a combination of negative lens and sawtooth grating of the present invention, FIG. 3(a) is a lens array, and FIG. 3(b) is a sawtooth surface array.

Figure 4:
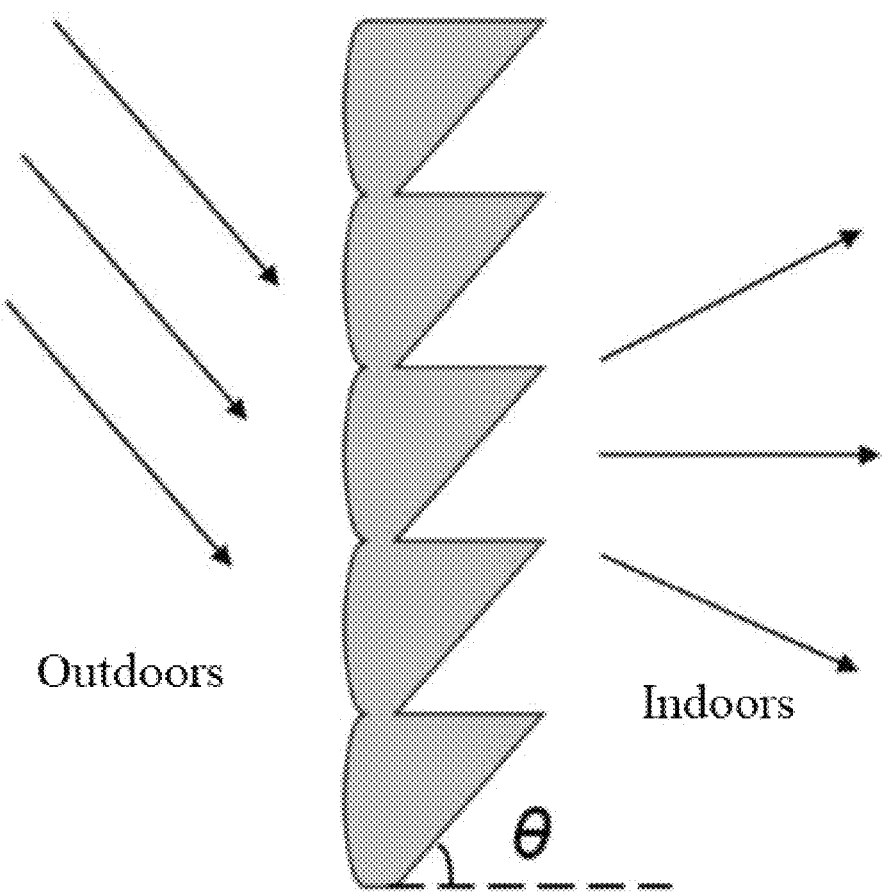

FIG. 4 is a schematic structural diagram of a monolithic natural light homogenization lighting method based on a combination of positive lens and sawtooth grating provided in Embodiment 3 of the present invention;

in the figure, the natural light at a high angle outdoors disperses horizontally to the indoor space after passing through the device.

Figure 5:
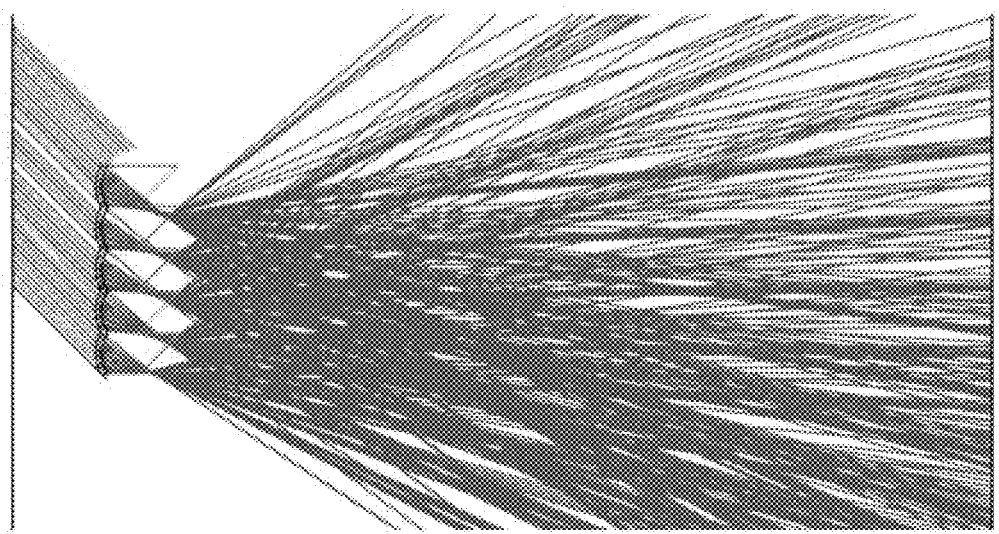

FIG. 5 is a simulation result diagram of a monolithic natural light homogenization lighting method based on a combination of positive lens and sawtooth grating provided in Embodiment 3 of the present invention;

In the figure, the first surface of the design device is a convex lens, and the second surface is a sawtooth surface array; the incident natural light at a high angle is collected by the lens array surface, and collected to the rear surface through the intermediate medium made of the same material between the two surfaces, and then horizontally dispersed to the indoor space after being refracted by an inclined surface.

Figure 6:
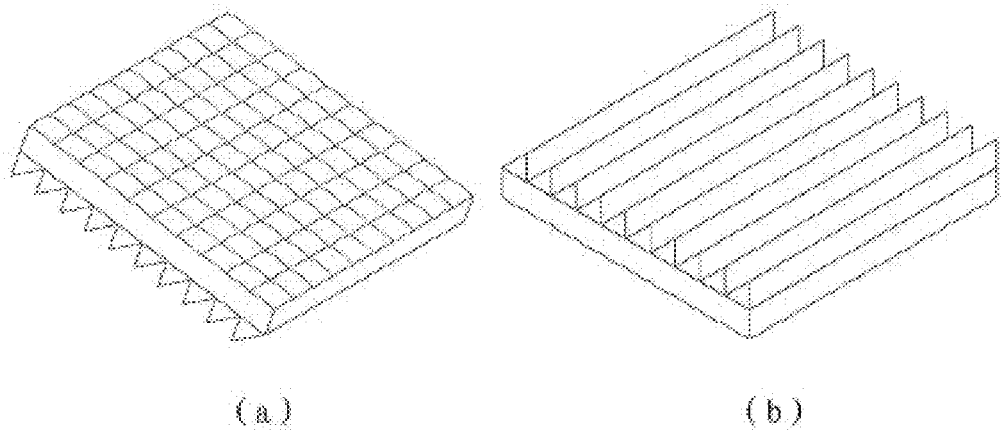

FIG. 6 is a three-dimensional view of a mechanical structure of a monolithic natural light homogenization lighting method based on a combination of positive lens and sawtooth of the present invention, FIG. 6(a) is a lens array, and FIG. 6(b) is a sawtooth surface array.

DETAILED DESCRIPTION

Exemplary embodiments of the present invention will be described below in conjunction with the accompanying drawings. For the sake of clarity and conciseness, not all features of the actual implement are described in the description. However, it should be understood that many implementation-specific decisions must be made in the process of developing any such practical embodiment, so as to achieve specific objectives of the developers, such as meeting those restrictions associated with the system and the business, and those restrictions vary with the implementation. It should be also understood that although the development work is likely to be very complex and time-consuming, such development work is merely a routine task for those skilled in the art benefiting from the disclosure of the present invention.

It should be further noted that, in order to avoid obscuring the present invention due to unnecessary details, only the structure and/or processing steps closely related to the solution according to the present invention are shown in the accompanying drawings, while other details that have little to do with the present invention are omitted.

Figure 1:
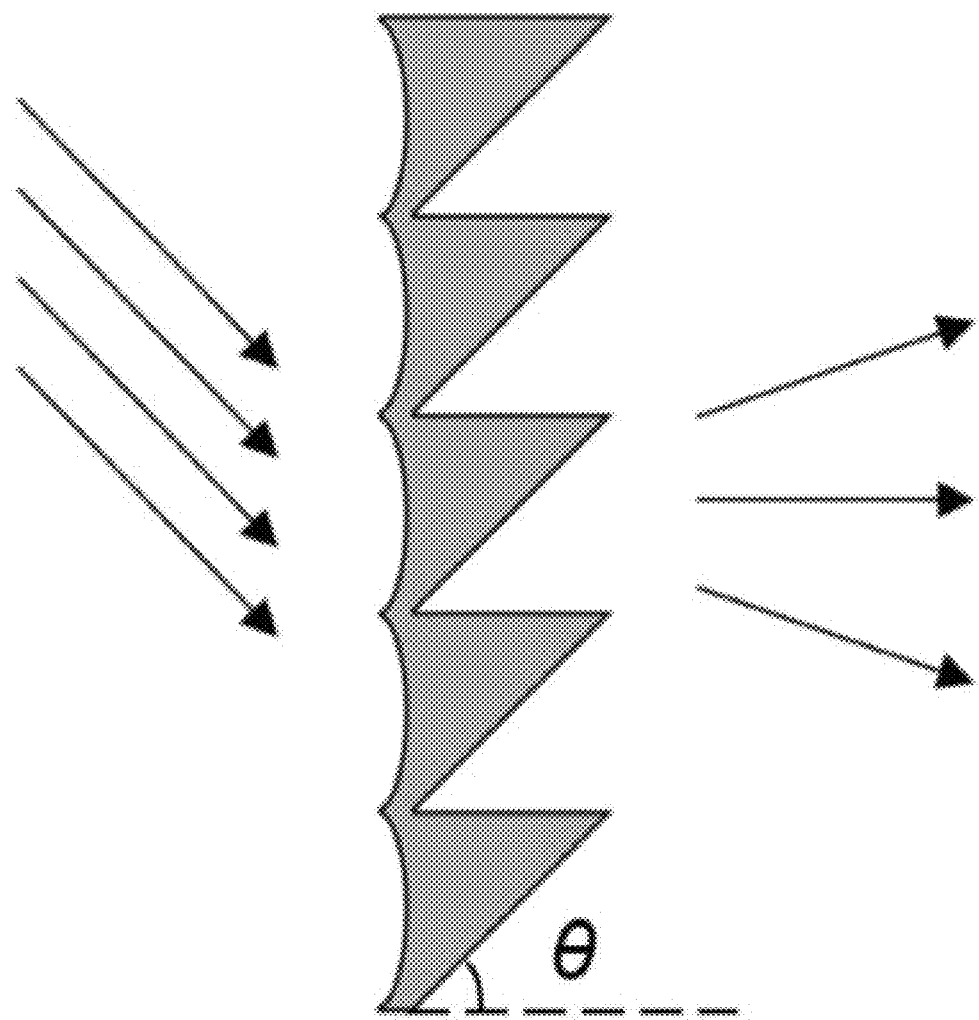
FIG. 1 is a schematic structural diagram of a monolithic natural light homogenization lighting method based on a combination of negative lens and sawtooth grating provided in Embodiment 1 of the present invention.

Embodiment 1: as shown in FIG. 1, the present embodiment provides a monolithic natural light homogenization lighting device and method based on a combination of negative lens and sawtooth grating, including a front surface and a rear surface in an array form, the first surface is a lens array, and the lenses of the lens array are in the form of concave lenses, as shown in FIG. 3(a); and the second surface is a sawtooth surface array, as shown in FIG. 3(b); the lens array is used for collecting outdoor natural light, and transmitting to the sawtooth surface array through the intermediate medium made of the same material between the two surfaces; and the sawtooth surface array is used for deflecting the incident natural light to the indoor space after being refracted by an inclined surface. Both the concave lens array and the sawtooth surface array include n unit structures, which correspond to one to one, and n is a natural number greater than or equaling to 1.

More specifically, both the front surface and the rear surface in an array form realize the modulation of different phases of the incident light, separately. Specifically, the additional phase modulation $\varphi_1$ of the first surface to the incident light can be expressed as $$\varphi_1 = -\frac{\pi(x_1^2 + y_1^2)}{\lambda f},$$

where ($x_1$, $y_1$) are the positions of the incident wavefront of the lens array, $\lambda$ represents the incident wavelength, for which the central wavelength is generally taken, and f represents the focal length of the lens. The additional phase modulation $\varphi_2$ of the second surface to the incident light can be expressed as $$\varphi_2 = -\frac{2\pi}{\lambda} y_2 \cdot \sin\theta,$$

where $y_2$ represents the position of the incident wavefront of the sawtooth surface array, and $\theta$ represents the angle of incident light on the sawtooth surface.

More specifically, the lenses of the lens array are in the form of concave lenses, the lens surface is consistent with the incident direction of natural light, and the normal of the lens surface forms an acute angle to the angle of incident light.

More specifically, an expression of the thickness z at different positions ($x_1$ and $y_1$) on a concave lens is $$z = -\frac{x_1^2 + y_1^2}{r + \sqrt{r^2 - (x_1^2 + y_1^2)}};$$

where r represents the radius of curvature of the concave lens, the surface form of the lens array may be spherical or other forms, and the radius of curvature is 1-5 times the minimum spacing between the concave lens and the sawtooth grating.

More specifically, the sawtooth surface array refracts most of the light in the horizontal direction through refraction, and its inclination angle is 20°-70°.

More specifically, the lens array corresponds to the sawtooth surface array one to one, and the center position of the sawtooth matches the optical axis of the concave lens unit.

More specifically, the monolithic device material shall be the high-transmittance material with a transmittance above 85%, including but not limited to glass, resin and transparent plastic.

More specifically, both front and real surface arrays are in the form of square full-aperture arrays with a high filling rate above 95%.

In order to verify the effect of the above device of the present invention, concave lenses are selected for the first lens array, and spherical lens are used, the radius of curvature r=−1 mm, the focal length of the lens f=−2 mm, the inclination angle of second sawtooth grating θ=45°, the first lens array corresponds to the second sawtooth grating one to one, the spacing between the two planes is 1.5 mm, the size of the array is 1 mm*1 mm, a 5*5 array is selected, ZF6 glass is selected as the material, and the light divergence effect is simulated. The simulation results are shown in FIG. 2.

Embodiment 2: on the basis of the device in Embodiment 1, the present embodiment provides a monolithic natural light homogenization lighting method based on negative lens and sawtooth grating, the outdoor natural light is collected by the lens array, and transmitted to the sawtooth surface array through the intermediate medium made of the same material between the two surfaces; and the lenses of the lens array are in the form of concave lenses; and the sawtooth surface array deflects the incident natural light to the indoor space after being refracted by an inclined surface.

Embodiment 3: as shown in FIG. 4, the present embodiment provides a monolithic natural light homogenization lighting device based on a combination of positive lens and sawtooth grating, including a front surface and a rear surface in an array form, the first surface is a lens array, and the lenses of the lens array are in the form of convex lenses, as shown in FIG. 6(a); and the second surface is a sawtooth surface, as shown in FIG. 6(b); the lens array is used for collecting outdoor natural light, and transmitting to the sawtooth surface array through the intermediate medium made of the same material between the two surfaces; and the sawtooth surface array is used for deflecting the incident natural light to the indoor space after being refracted by an inclined surface. Both the convex lens array and the sawtooth surface array include n unit structures, which correspond to one to one, and n is a natural number greater than or equaling to 1.

More specifically, both the front surface and the rear surface in an array form realize the modulation of different phases of the incident light, separately. Specifically, the additional phase modulation $\varphi_1$ of the first surface to the incident light can be expressed as $$\varphi_1 = -\frac{\pi(x_1^2 + y_1^2)}{\lambda f},$$

where ($x_1$, $y_1$) are the positions of the incident wavefront of the lens array, $\lambda$ represents the incident wavelength, for which the central wavelength is generally taken, and f represents the focal length of the lens. The additional phase modulation $\varphi_2$ of the second surface to the incident light can be expressed as $$\varphi_2 = -\frac{2\pi}{\lambda} y_2 \cdot \sin\theta,$$

where $y_2$ represents the position of the incident wavefront of the sawtooth surface array, and $\theta$ represents the incident angle of natural light on the sawtooth surface.

More specifically, the lenses of the lens array are in the form of convex lenses, the lens surface faces the incident direction of natural light, and the normal of the lens surface forms an acute angle to the angle of incident light.

More specifically, an expression of the thickness z at different positions ($x_1$ and $y_1$) on a convex lens is $$z = \frac{x_1^2 + y_1^2}{r + \sqrt{r^2 - (x_1^2 + y_1^2)}};$$

where r represents the radius of curvature of the convex lens, the surface form may be spherical or other forms, and the radius of curvature is 1-5 times the minimum spacing between the convex lens and the sawtooth grating.

More specifically, the sawtooth surface array refracts most of the light in the horizontal direction through refraction, and its inclination angle is 20°-70°.

More specifically, the lens array corresponds to the inclined surface one to one, and the center position of the sawtooth matches the optical axis of the convex lens unit.

More specifically, the monolithic device material shall be the high-transmittance material with a transmittance above 85%, including but not limited to glass, resin and transparent plastic.

More specifically, both front and real surface arrays are in the form of square full-aperture arrays with a high filling rate above 95%.

In order to verify the effect of the above device of the present invention, convex lenses are selected for the first lens array, and spherical lens are used, the radius of curvature r=1 mm, the focal length of the lens f=2 mm, the inclination angle of second sawtooth grating θ=45°, the first lens array corresponds to the second sawtooth grating one to one, the spacing between the two planes is 1.5 mm, the size of the array is 1 mm*1 mm, a 5*5 array is selected, ZF6 glass is selected as the material, and the light divergence effect is simulated. The simulation results are shown in FIG. 5.

Embodiment 4: on the basis of the device in Embodiment 3, the present embodiment provides a monolithic natural light homogenization lighting method based on positive lens and sawtooth grating, the outdoor natural light is collected by the lens array, and transmitted to the sawtooth surface array through the intermediate medium made of the same material between the two surfaces; and the lenses of the lens array are in the form of convex lenses; and the sawtooth surface array deflects the incident natural light to the indoor space after being refracted by an inclined surface.

Although the implementation disclosed in the present invention is described as above, the contents thereof are only the implementation adopted to facilitate the understanding of the technical solutions of the present invention, and are not intended to limit the present invention. Those skilled in the art to which the present invention belongs may make any modifications and changes in the form and details of the implementation without departing from the core technical solution disclosed in the present invention, but the scope of protection limited by the present invention shall still be subject to the scope limited by the appended claims.

The invention claimed is:

1. A monolithic natural light homogenization lighting device based on lens and sawtooth grating, comprising a front surface and a rear surface in an array form, the first surface is a lens array, the second surface is a sawtooth surface array, and the lens array is used for collecting outdoor natural light, and transmitting to the sawtooth surface array through the intermediate medium made of the same material between the two surfaces; and the sawtooth surface array is used for deflecting the incident natural light to the indoor space after being refracted by an inclined surface, wherein the lenses of the lens array are in the form of spherical concave lenses or spherical convex lenses, the surface of lenses faces the incident direction of natural light, and the normal of the lens surface forms an acute angle to the angle of incident light, both front and rear surface arrays are in the form of square full-aperture arrays with a filling rate above 95%.

2. The monolithic natural light homogenization lighting device based on lens and sawtooth grating according to claim 1, wherein the additional phase modulation $\varphi_1$ of the lens array to the natural light is expressed as $$\varphi_1 = -\frac{\pi(x_1^2 + y_1^2)}{\lambda f},$$

wherein $x_1$ and $y_1$ are the positions of the incident wavefront of the lens array, $\lambda$ represents the central wavelength of the natural light, and f represents the focal length of the lens; while the additional phase modulation $\varphi_2$ of the sawtooth surface array to the incident natural light is expressed as $$\varphi_2 = -\frac{2\pi}{\lambda} y_2 \cdot \sin\theta,$$

wherein $y_2$ represents the position of the incident wavefront of the sawtooth surface array, and θ represents the incident angle of natural light on the sawtooth surface.

3. The monolithic natural light homogenization lighting device based on lens and sawtooth grating according to claim 1, wherein an expression of the thickness z at different positions $x_1$ and $y_1$ on a concave lens is $$z = -\frac{x_1^2 + y_1^2}{r + \sqrt{r^2 - (x_1^2 + y_1^2)}};$$

wherein r represents the radius of curvature of the concave lens, and the radius of curvature is 1-5 times the minimum spacing between the concave lens and the sawtooth grating; an expression of the thickness z at different positions $x_1$ and $y_1$ on a convex lens is $$z = \frac{x_1^2 + y_1^2}{r + \sqrt{r^2 - (x_1^2 + y_1^2)}};$$

wherein r represents the radius of curvature of the convex lens, and the radius of curvature is 1-5 times the minimum spacing between the convex lens and the sawtooth grating.

4. The monolithic natural light homogenization lighting device based on lens and sawtooth grating according to claim 1, wherein the inclination angle of the sawtooth in the sawtooth surface array is θ, and the range of θ is 20°-70°.

5. The monolithic natural light homogenization lighting device based on lens and sawtooth grating according to claim 1, wherein the lens array corresponds to the sawtooth surface array one to one, and the center position of the sawtooth matches the optical axis of the lens unit.

6. The monolithic natural light homogenization lighting device based on lens and sawtooth grating according to claim 1, wherein the monolithic device material of the array is the high-transmittance material with a transmittance above 85%, comprising but not limited to glass, resin and transparent plastic.

7. A monolithic natural light homogenization lighting method based on lens and sawtooth grating according to claim 1, comprising:

the outdoor natural light is collected by the lens array, and transmitted to the sawtooth surface array through the intermediate medium made of the same material between the two surfaces; and the sawtooth surface array deflects the incident natural light to the indoor space after being refracted by an inclined surface.

\* \* \* \* \*